United States Patent [19]

Quackenbush

[11] Patent Number: 4,625,346

[45] Date of Patent: Dec. 2, 1986

[54] THREE PORTION SEAT-BED FOR RECREATIONAL VEHICLES

[75] Inventor: Howard M. Quackenbush, Apple River, Ill.

[73] Assignee: Flexsteel Industries, Inc., Dubuque, Iowa

[21] Appl. No.: 705,542

[22] Filed: Feb. 26, 1985

[51] Int. Cl.[4] .............................................. A47C 17/17

[52] U.S. Cl. ...................................... 5/37 R; 5/51 G; 297/342

[58] Field of Search ..................... 5/37 B, 37 C, 37 R, 5/38, 51 G, 55 R, 55 G; 297/105, 112, 342, 65, 118

[56] References Cited

U.S. PATENT DOCUMENTS

| | | | |
|---|---|---|---|
| 4,001,901 | 1/1977 | Quakenbush | 5/37 R |
| 4,037,872 | 7/1977 | Quakenbush | 297/65 |
| 4,131,960 | 1/1979 | Quakenbush | 5/37 R |
| 4,186,960 | 2/1980 | Mizelle | 296/65 X |
| 4,343,508 | 8/1982 | Heling et al. | 5/37 B |
| 4,365,369 | 12/1982 | Plume | 5/37 C X |
| 4,495,887 | 1/1985 | Mondrush | 5/37 R X |
| 4,512,048 | 4/1985 | Isham et al. | 297/65 X |
| 4,543,675 | 10/1985 | Shrock | 5/37 R |

FOREIGN PATENT DOCUMENTS

| | | | |
|---|---|---|---|
| 2530441 | 1/1984 | France | 5/37 R |
| 22557 | 2/1980 | Japan | 297/342 |
| 22558 | 2/1980 | Japan | 297/342 |

*Primary Examiner*—John E. Murtagh
*Assistant Examiner*—Richard Chilcot

[57] ABSTRACT

A seat bed for a recreational vehicle has a seat portion, an inner back portion, and an outer back portion supported by a linkage structure on a base structure. The linkage structure provides for movement of the seat bed from a seat position to a bed position where the seat, inner back, and outer back portions are supported in generally the same horizontal plane. The linkage structure includes front, rear, and outer back swing arms which articulate the seat, inner back, and outer back portions between the seat and bed positions. A hook-shaped support member reinforces the seat and inner back portions in the bed position. A V-shaped latch structure is adapted to latchingly secure the inner back portion in the bed position and to secure the outer back portion in the seat position. A telescopic rod transmits movement of the seat portion to the latch structure to automatically unlatch the inner back portion when the seat bed assembly is moved from the bed position to the seat position.

24 Claims, 5 Drawing Figures

7
144
44
59
54
46
15
16
48
18
19
58
50
42
52
66
127
164
98
96
94
38
12
13
40
102
112
36
114
108
106
32
76
74
78
85
158
31
122
154
116
56
88
28
156
62
68
162
72
86
30
26
20
24
22
124
92
168
126
166
60
64
82
172
80
170
160
70

132
146
148
144
85
59
46
127
130
83
138
58
118
158
132a
117
140
34
28
120
134
136
128
116b
116
116c
116a

THREE PORTION SEAT-BED FOR RECREATIONAL VEHICLES

FIELD OF THE INVENTION

This invention relates to a seat-bed construction and more particularly to a construction which permits highly efficient use of space, as in recreational vehicles such as campers or mobile homes, and which is sturdy in construction and highly reliable while being relatively simple and economical to manufacture.

BACKGROUND OF THE PRIOR ART

In recreational vehicles, and in other applications where space is at a premium, it is advantageous and well-known in the prior art to provide a multi-purpose seat which may be manipulated to form a generally horizontal cushioned surface which may be used as a bed.

U.S. Pat. No. 4,131,960 discloses a seat-bed design having a seat portion and a back portion supported on a linkage which allows the seat portion and back portion to be articulated between a seat position and a bed position. In the seat position, the seat portion is generally horizontal and the back portion extends generally vertically upward from the rear edge of the seat portion to form a conventional seat. When articulated to the bed position, the seat portion and the back portion lie adjacent each other in the same horizontal plane.

The disadvantage of this arrangement is that the length of the seat-bed in the bed position is the length of the seat portion plus the height of the back portion. This produces a rather short bed which is suitable for a child, but uncomfortably short for an adult.

SUMMARY OF THE INVENTION

This invention provides an improved seat-bed design for use in recreational vehicles or in other applications where space is limited. The seat-bed structure has a third portion, or outer back portion, in addition to the usual seat portion and back portion of the seat bed. The outer back portion is deployed with the seat portion and back portion to form a bed of adequate length when the seat bed is placed in the bed position.

It is an object of this invention to provide a support structure for the outer back portion.

It is further an object of this invention to provide a linkage structure which articulates the outer back portion during the movement of the seat portion and front back portion into the bed position.

It is further an object of this invention to provide a latching system for latching the seat bed linkage in the seat position and in the bed position.

DESCRIPTION OF THE PREFERRED EMBODIMENT

Figure 1:
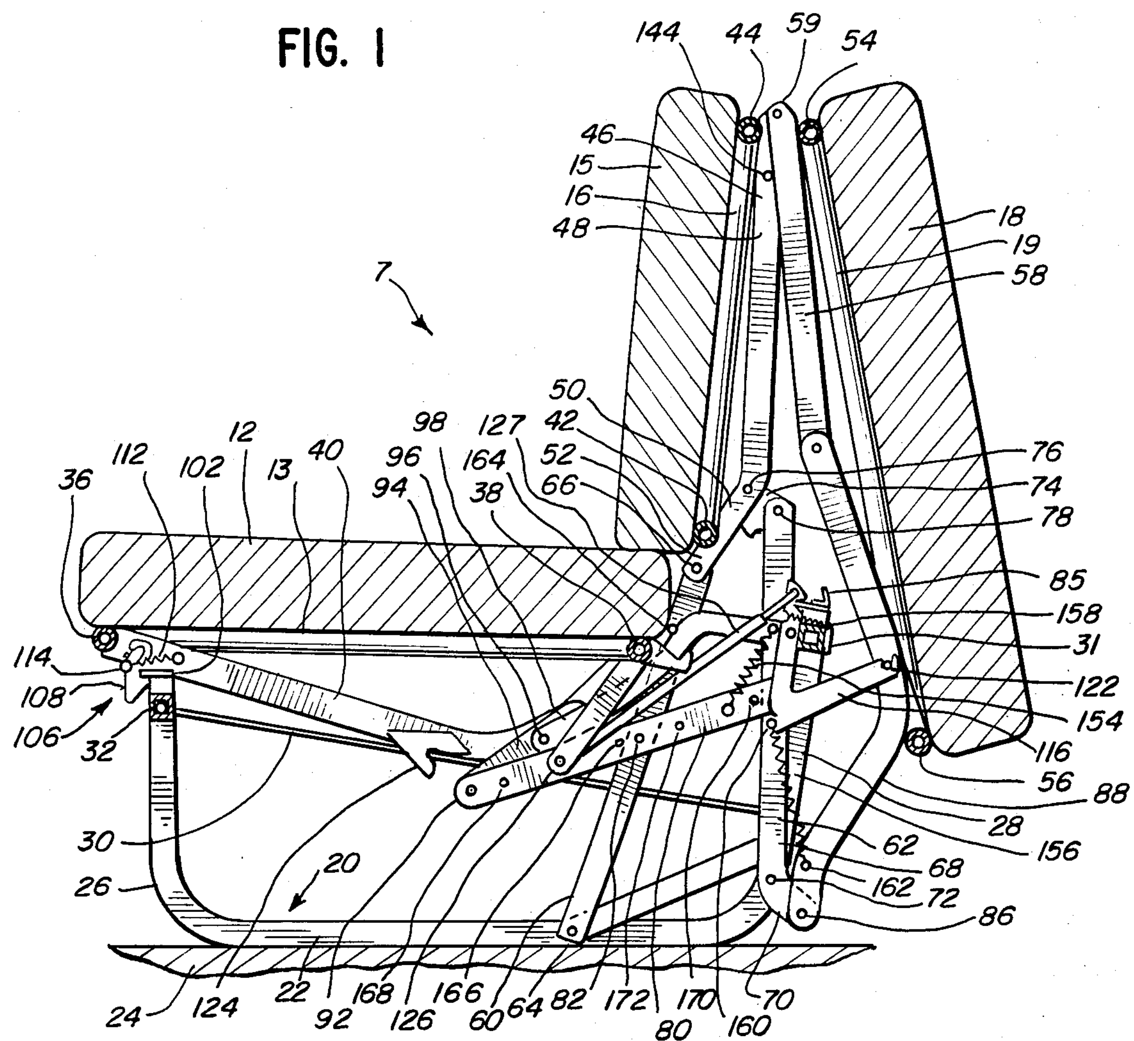
FIG. 1 is an elevational sectional view through a convertible seat bed unit according to this invention, showing the support and linkage structure of one side of the unit in the seat position.
Figure 2:
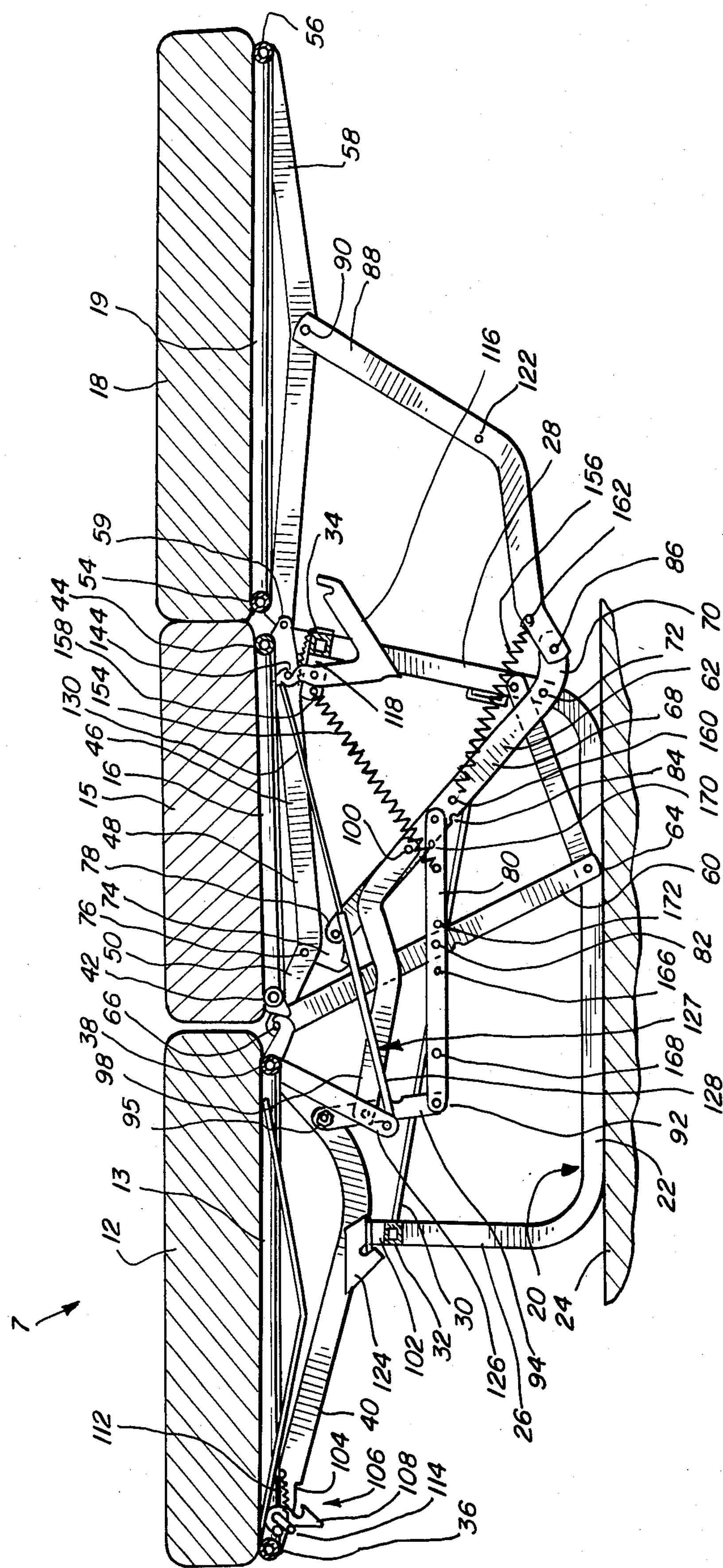
FIG. 2 is a view as shown in FIG. 1, but illustrating the seat bed unit in the bed position.

In FIGS. 1 and 2, reference numeral 7 generally designates a seat bed unit constructed along the lines of the principles of this invention. The seat bed 7 may be used in a wide variety of applications but has been designed especially for use in a recreational vehicle where space is at a premium. A seat cushion 12 is secured to a seat portion frame or support structure 13, an inner back cushion 15 is secured to an inner back portion frame or support structure 16, and an outer back cushion 18 is secured to an outer back portion frame or support structure 19. The cushions 12, 15, and 18 may be formed of resilient material, or may be more elaborate upholstered spring structures.

When the seat-bed 7 is in the seat position (FIG. 1), the inner back cushion 15 projects upwardly and slightly rearwardly from the rear edge portion of the seat cushion 12. The outer back cushion 18 projects downwardly from the upper terminal end of inner back cushion 15. For comfort of a seated person, seat cushion 12 preferably is inclined slightly downwardly and rearwardly.

In the bed position (FIG. 2), seat cushion 12, inner back cushion 18, and outer back cushion 18 occupy the same horizontal plane. Inner back cushion 18 extends horizontally away from the rear edge portion of seat cushion 12. Outer back cushion 18 extends horizontally rearward from the rear end of inner back cushion 15.

A base or main frame structure is provided including a frame or end member 20 having a horizontal portion 22 adapted to connect with or rest against the floor 24, a forward portion 26 extending upwardly from the forward end of horizontal portion 22, and a rearward portion 28 extending upwardly from the rearward end of horizontal portion 22. Reinforcement means 30 extends between forward portion 26 and rearward portion 28 to rigidify the frame structure.

The end member 20 is connected to a similar end member at the opposite end of the seat bed by two cross bars 32 and 34 (FIG. 4) fixedly attached to forward frame portion 26 and rear frame portion 28.

The seat portion support structure 13 is formed of tubular stock, and includes front and rear tubular members 36 and 38. Tubular members 36 and 38 are secured to seat bar 40 which extends angularly rearward and downward from front tubular member 36, and then curves upward to join rear tubular member 38.

The inner back portion support structure 16 is similar to the seat portion support structure 13, and includes front and rear tubular members 42 and 44 connected by a bar 46. Bar 46 has angularly related portions 48 and 50. As shown in FIG. 1, in the seat position, bar portion 48 is essentially vertical, while portion 50 extends angularly downward and forward from the lower end of portion 48. An additional extension portion 52 extends beyond the lower end of portion 50 and the front tubular member 42.

Outer back portion support structure 19 is also similarly configured, including front and rear tubular members 54 and 56, as best shown in FIG. 2. Bar 58 extends between tubular members 54 and 56. Bar 58 extends angularly downward from front tubular member 54 to a low point at roughly the midpoint between tubular members 54 and 56, and then extends angularly upward to join with rear tubular member 56. For relative articulation of the inner and outer back portion of the seat-bed 7, outer back bar 58 is pivotally connected to inner back bar 46 by pin 59.

For supporting the seat, inner back, and outer back portion support structures 13, 16, and 19 and effecting the required movements thereof, a linkage arrangement is provided which includes front and rear swing arms 60 and 62.

The lower end of front swing arm 60 is pivotally connected by a pin 64 to the horizontal portion 22 of frame member 20. The upper end of front swing arm 60 is pivotally connected by pin 66 to extension portion 52 of bar 46.

The rear swing arm 62 includes a main or vertical portion 68 and an extension 70. The lower end of main portion 68 is pivotally connected by pin 72 to rearward frame portion 28. A connection member 74 links the upper end of main portion 68 with the inner back bar 46, allowing relative movement thereof. Connection member 74 is pivotally connected to bar 46 and main portion 68 by pins 76 and 78.

An additional link 80 is provided to connect the front and rear swing arms 60 and 62, link 80 being connected to an intermediate point on the front swing arm 60 by a pin 82 and being connected to an intermediate point on the rear swing arm main portion 68 by a pin 84.

With the arrangement as this far described, forward movement of the lower portion of the inner back support structure 16 results in movement of the inner back support structure 16 from the seat position in which the inner back support structure 16 is inclined upward and rearward (FIG. 1) to the bed position in which the inner back support structure 16 is generally horizontal (FIG. 2). During this movement, the upper end of the inner back support structure 16 travels in a substantially vertical path. Seat portion support structure 13 moves forward to accommodate the inner back support structure 16 in its new horizontal position where tubular members 38 and 42 are adjacent each other in substantially the same horizontal plane.

In the bed position, bar 46 of the inner back support structure 16 is adjacent flange 83 which is mounted on the upper end of rearward portion 28 of end frame portion 20. The support structure 16 is secured against lateral movement by side sway guide member 85 attached to flange 83 and protruding upward therefrom between the bar 46 and the side tubular members of support structure 16. When forces tending to cause lateral sway are applied to the support structure 16, guide member 85 abuts and braces either bar 46 or the support structure side tubular member, depending on the direction of the forces applied.

Extension portion 70 of rear swing arm 62 is connected by pin 86 to one end of outer back swing arm 88. The other end of the outer back swing arm 88 is pivotally connected to the approximate midpoint of outer back frame bar 58 by pin 90.

In the seat position, outer back support structure 19 extends generally downward and rearward form pin 59 and the upper end of inner back support structure 16. This allow for movement of the outer back support structure 19 in conjunction with movement of the inner back support structure 16 to and from the seat and bed positions. Because of the pivotal connection between outer back frame bar 58 and inner back frame bar 46 the upper end of outer back support structure 19 travels in a generally vertical path adjacent to the path taken by the top end of inner back support structure 16. As the upper end of the inner back support structure 16 moves downward, the rear swing arm 62 rotates about pin 72. This elevates extension portion 70 and the attached outer back swing arm 88. This movement results in th outer back swing arm 88 extending the lower end of the outer back support structure 19 rearward until the outer back support structure 19 is supported in generally the same horizontal plane as seat and inner back support structures 13 and 16. In this the bed position, tubular member 44 of inner back support sructure 16 is supported adjacent tubular member 54 of outer back support structure 19.

For support of the seat support structure 13, link 80 is extended forward beyond pin 82 to a forward end which is pivotally connected through a pin 92 to the lower end of a link 94. The upper end of link 94 is pivotally connected to seat frame bar 40 by a pin 95. At an intermediate point the link 94 is pivotally connected to a forward end of sinuous link 98 by a pin 96. In the bed position (FIG. 2), sinuous link 98 extends downwardly and rearwardly from pin 96, then curves upwardly at generally its midpoint, and then once again curves to extend angularly downward and rearward to its rearward end where it is pivotally connected to rear swing arm 62 by pin 100.

In the seat position shown in FIG. 1, the front tubular member 42 of the inner back support structure 16 is positioned upward and slightly rearward of the rear tubular member 38 of seat frame 13. When the seat bed is placed in the bed position shown in FIG. 2, the sinuous link 98 serves to draw the rear swing arm 62 forward. The connection member 74 articulates the inner back support structure 16 in forward motion resulting in the forward end of inner back cushion 13 being brought closer to the rear end of seat cushion 12, thereby providing a substantially continuous surface to lie upon. The pivotal connection of inner back bar 48 and outer back bar 58 by pin 59 allows the bars 48 and 58 to rotate with respect to each other, causing the upward end of inner back cushion 15 and the upward end of outer back cushion 18 to rotate towards each other and to meet when the seat bed is in the bed position, also providing a substantially continuous surface.

In the seat position (FIG. 1), a bar 102 secured on top of the bar 26 of the frame structure 20 engages in a notch 104 (FIG.2) in seat frame bar 40. The bar 102 is secured in the notch 104 by a forward latch arrangement indicated at 106. The forward latch arrangement includes a lock member 108 having a recess therein which is adapted to accommodate the bar 102. The lock member 108 is biased by spring 112 to catch the bar 102 against notch 104 and retain bar 102 therein. The lock member 108 is connected with a release handle 114 which allows an operator to manually release the bar 102 from the notch 104 for moving the seat bed 7 from the seat position to the bed position. The release is accomplished by pressing release handle 114 upward causing lock member 108 to pivot away from bar 102, allowing bar 102 to leave the notch 104.

Figure 3:
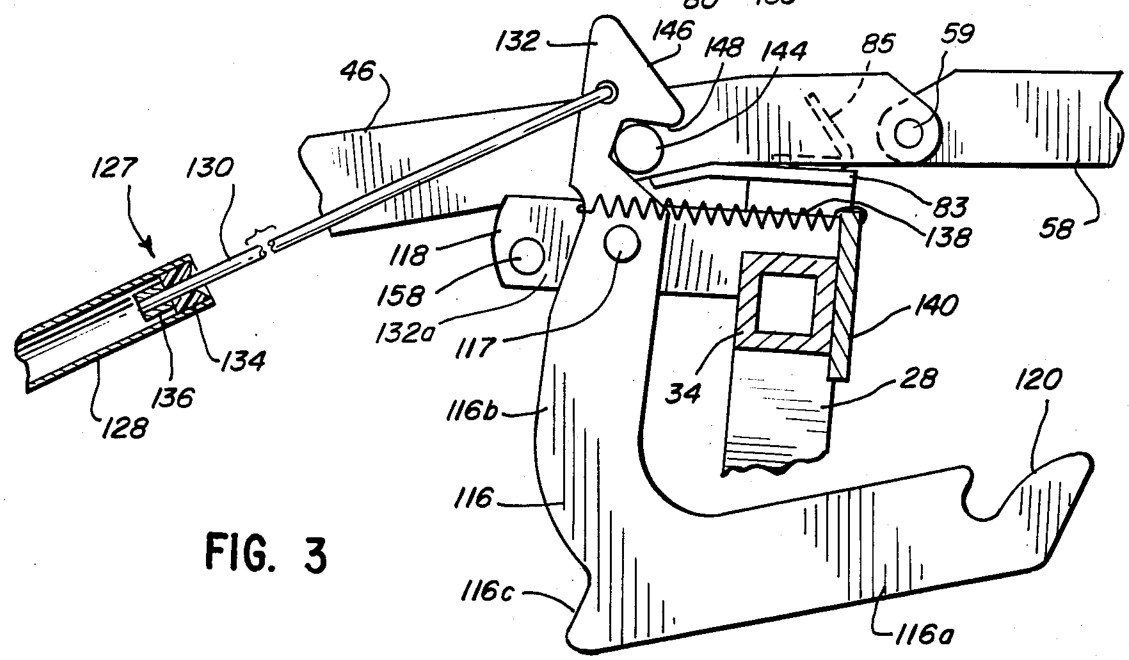
FIG. 3 is an enlarged view as in FIG. 2, having a portion of the inner back portion support structure removed and showing a portion of the latching arrangement which latches the seat bed in either the seat position or the bed position.

In the seat position, outer back support structure 19 is supported primarily by the pivotal connection of pin 59. This pivotal connection would allow the outer back portion 18 to swing loosely toward and away from the linkage structure of the seat bed 7 responsive to various forces caused by movements of the recreational vehicle during driving. To prevent this, the outer back support structure 19 is secured against movement by rear lock or V-shaped latch structure 116 which is pivotally supported by pin 117 on bracket 118 mounted on cross bar 34. V-shaped latch structure 116 has two angled leg portions 116*a* and 116*b* (FIG. 3). Leg portion 116*a* is provided with an upward-facing recess or notch 120 which is configured to receive a pin 122 mounted on outer back swing arm 88. The notch 120 is shaped to allow the pin 122 only upward motion and to restrict the horizontal motion of pin 122. This restrains the outer back support structure 19 from movement toward and away from the seat-bed 7.

To change the seat-bed 7 from the seat position to the bed position, the forward end of the seat support structure 13 is simply lifted and pulled forward to pull the link 94 forward and to thereby cause the front and rear swing arms 60 and 62 to pivot forward. The forward movement is continued until a position of the seat support structure 13 is reached at which bar 102 is engaged by bed-position seat latch 124. Bed-position seat latch 124 accommodates bar 102 and restricts rearward horizontal movement of the seat support structure 13 during this engagement.

The rotation of rear swing arm 62 about pin 72 also causes the end of extension portion 70 to move upward, moving pin 86 upward. At the same time, rear swing arm portion 68, on which pin 160 is mounted, moves pin 160 forward and away from landing seat 116*c* of the latch structure 116. Spring 138 biases latch structure 116 to rotate, moving leg 116*a* downward. The combination of the downward movement of leg 116*a,* the curving shape of slot 120, and the upward movement of outer back swing arm 88 causes the notch 120 to release pin 122. The combination of the downward movement of pivotal pin 59 along with the release and initial upward movement of outer back swing bar 88 causes the lower end of outer back support structure 19 to move rearwardly while the upper end of outer back support structure 19 follows a generally vertical downward path, until the outer back support structure 19 lies in a generally horizontal plane and is supported extending rearward of the seat bed frame 20 by outer back swing arm 88.

The V-shaped latch structure 116 is adapted to pivot between a seat-latching position for securing the seat-bed 7 is the seat position and a bed-latching position for latching the seat-bed 7 in the bed position. This movement occurs responsive to movement of seat support structure 13.

The forward movement of seat support structure 13 results in the forward movement of actuator arm or armature 126 which is rigidly connected to the rear tubular member 38 and extends downwardly and forward therefrom. Alternatively, the armature 126 may be attached at a different angle, extending downwardly and rearward from member 38. The lower end of armature 126 is pivotally connected to telescoping actuator rod generally indicated at 127.

As best shown in FIG. 3, telescoping rod 127 includes a hollow cylinder member 128 pivotally connected with armature 126. Hollow cylinder member 128 supports therein a plunger member 130 which is pivotally connected to end portion 132 of leg portion 116*b* of V-shaped latch structure 116, as best shown in FIG. 3. Hollow cylinder member 128 is provided at its rearward end with an apertured plug 134 having an aperture therein which permits sliding movement of the plunger member 130 within hollow cylinder member 128. At its forward end, plunger member 130 has a stop portion 136 secured within the hollow cylinder member 128. The stop portion 136 is large enough to be unable to pass through the aperture in plug 134. This allows relatively free relative motion between plunger member 130 and hollow cylinder member 128 until a fully extended position is reached where stop member 136 abuts apertured plug 134.

A tension spring 138 connects end portion 132 of V-shaped latch structure 116 to flange element 140 on the cross bar 34. The relatively free motion between cylinder member 128 and plunger member 130 allows the spring 138 to bias V-shaped latch structure 116 to tend to pivot about pin 117, causing end portion 132 to move to the rear until notch 132*a* comes to rest against stop pin 117, placing the latch structure in the bed latching position. When the rear swing arm 62 is pivoted forward, pin 160 is withdrawn from contact with latch structure 116 and latch structure 116 is free to move responsive to spring 138. When the seat support structure 13 has been drawn forward to the position taken in the bed position shown in FIG. 2 the spring 138 has drawn the end portion 132 of the latch structure 116 to the bed-latching position where recess or notch 142 in the latch structure 116 may accommodate pin 144 on bar 46 for latching the structure in the bed position. Pin 144 enters notch 142 by first moving downward with inner back bar 46 to engage upper latch surface 146, which is angled to cammingly rotate latch structure 116 about pin 117 against the force spring 138 responsive to downward pressure of pin 144. The downward motion of pin 144 continues until the pin 144 meets flange 83 or until the pin 144 below upper notch surface 148. Thereupon, spring 138 rotates latch structure 116 to bring end 132 rearward, and the pin 144 is then entrapped and restrained against upward movement by upper notch surface 148. This latches the seat bed 7 in the bed position, and holds the inner back support structure 16 and outer back support structure 19 from buckling upward, especially when excessive loads are applied on end tubular member 56 of outer back support structure 19.

The stop portion 136 is threadedly mounted on the plunger member 130, rendering adjustable the length of the telescoping rod 127 in the extended position. This times the release of the lock on pin 144 to occur responsive to an upward lift of the front of seat portion support structure 13 causing angular movement of armature 126 when seat latch 124 is disengaged from bar 102. This angular movement of the armature 126 draws the extended telescopic rod 127 forward, and pivots upper portion 132 of latch structure 116 forward against the force of spring 138. This withdraws upper notch surface 148 from above pin 144 allowing pin 144 to move upwardly, releasing the inner back support structure 16.

Figure 4:
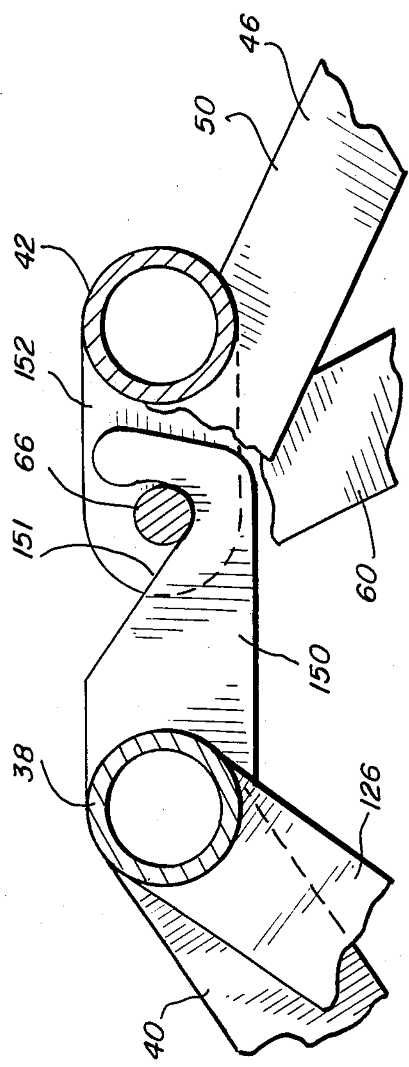
FIG. 4 is an enlarged view as in FIG. 2, showing the latching connection between the seat portion and the inner back portion.
Figure 5:
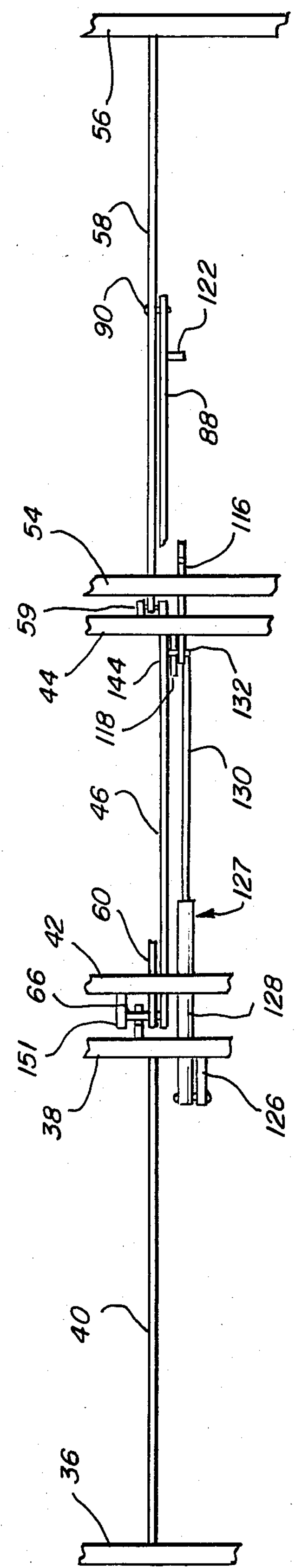
FIG. 5 is a partial plan view of FIG. 2.

As best shown in FIG. 4, the structure of the seat bed 7 in the bed position is also strengthened by hook support or stablilizing member 150 having a recess 151 therein adapted to receive and retain securing member or pin 66. Pin 66 serves as a pivotal connection between inner back bar 46 and front swing arm 60 and is additionally supported by brace member 152 which is laterally spaced from the point of pivotal connection of bar 46 and front swing arm 60 (FIG. 4). Brace 152 is rigidly attached to the front tubular member 42 of inner back support structure 16. The hook support member 150 prevents most relative movement of the pin 66 and the inner back support structure 16 and the rear portion of seat support structure 13 to the rear or downward. This secures the seat support structure 13 against rotation caused by weight placed in the front portion of the seat support structure 13, as by a person seated on the forward edge of the bed, as well as securing the edge of the inner back support structure 16.

To move from the bed position to the seat position the forward end of the seat support structure 13 is lifted and moved forward to disengage bar 102 from bed position seat latch 124. the initial upward movement of the front edge of the seat support structure 13 rotates the hook support member 150 downward to release pin 66 and the inner back support stucture 16 for relative movement.

The forward motion of the seat support structure 13 is transmitted through armature 126 to pivot the upper end 132 of V-shaped latch structure 116 forward. The releases pin 144 from notch 142, allowing the inner back bar 46 to move upward. Then the seat is pushed rearward producing a reverse movement of the elements of linkage mechanism. This movement is assisted by tension springs 154 and 156. Spring 154 is connected with link 80, near the rearward end where link 80 is pivotally connected to rear swing arm 62. The other end of spring 154 is connected with pin 158 on bracket 118. Spring 154 biases the movement of the linkage to draw the rear swing arm 62 toward the seat position.

Spring 156 is connected to pin 160 at generally the midpoint of rear swing arm 62, and to pin 162 on outer back swing arm 88. Spring 156 biases the linkage to draw together the inner and outer back support structures 16 and 19. This biasing produced by spring 156 draws the inner and outer back portions of seat bed 7 into the seat position. Accordingly the seat bed 7 is readily operated from the bed position to the seat position. To some extent, the forces applied by springs 154 and 156; tend to resist movement of the seat-bed from the seat postion to the bed position. However the weight of the components and the design of the linkage balance against this resistance, making movement to and from the seat and bed position relatively easy.

The final movements of the linkage latch the outer back support structure 19 in the seat position. Pin 160 or rear swing arm 62 engages latch structure seat 116c as rear swing arm 62 moves into the seat position. This rotates latch structure 116 against the bias of spring 138 to elevate notch 120 to meet and entrap pin 122 on outer back swing arm 88, thereby latching the outer back support structure 19 in the seat position.

Interengaging stop means are provided to give firm support of the seat, inner back, and outer back support structures 13, 16, and 19 in both the seat and bed positions by limiting movement of the linkage elements beyond the two positions. As best shown in FIG. 1, a stop pin 164 is provided on front swing arm 60 to engage sinuous link 98 in a notch thereon in the seat position. Stop pin 166 is mounted on the link 80 to engage a notch in front swing arm 60 in the seat position. A stop pin 168 is also mounted on the link 80 to engage link 94 in the seat position. A pin 170 is provided which engages the rear swing arm 62 in the seat position.

In the bed position, interengaging stop means also provide firm support. Pin 170 again engages the rear swing arm 62, but at a location spaced from the place of engagement in the seat position. The link 80 is provided with another stop pin 172 which engages the front swing arm 60 in the bed position, supporting the front portion of seat bed 7.

The front edge portion of the seat portion may be lifted when the seat bed is in the seat position after release of the lock member 106 for access to the space below the seat support structure 13 this space serves as a convenient storage area, especially for recreational vehicles where space is limited.

The foregoing description and the drawings are given merely to explain and illustrate the invention, and the invention is not to be limited thereto, except insofar as the appended claims are limited, since those skilled in the art who have this disclosure before them will be able to make modifications and variations therein without departing from the scope of the invention.

I claim:

1. A convertible seat-bed assembly, comprising:
   a base structure;
   a seat support structure for supporting a seat cushion secured thereto and having a rearward edge portion;
   an inner back support structure for supporting an inner back cushion secured thereto and having first and second edge portions;
   an outer back support structure for supporting an outer back cushion secured thereto and having a forward edge portion;
   connection means movably connecting the forward edge portion of the outer back support structure with the second edge portion of the inner back support structure;
   linkage means for supporting the seat, inner back, and outer back support structures from the base structure for movement between a seat position and a bed position;
   the seat support support structure, the inner back strucure, and the outer back support structure being adapted to occupy generally the same horizontal plane in the bed position, the rearward edge portion of the seat support structure being adjacent the first edge portion of the inner back support structure and the second edge portion of the inner back support structure being adjacent the forward edge portion of the outer back support structure,
   the seat support structure extending rearwardly in the seat position, the first edge portion of the inner back support structure being spaced above and to the rear of the rearward edge portion of the seat support structure, the inner back support structure extending generally upward from the first edge portion, the forward edge portion of the outer back support structure being spaced rearwardly from the second edge portion of the inner back support structure, and the outer back support structure extending downwardly therefrom,
   the linkage means including
   rear swing arm means having a main portion and an extension portion formed integral therewith, the main portion being pivotally supported on the base structure, and supporting the inner back support structure, and
   an outer back swing arm means being movably connected with the extension portion and with the outer back support structure for supporting the outer back support structure and articulating same between the seat and bed positions.

2. The invention according to claim 1 and
   a securing member supported on the first edge portion of the inner back support structure, a stabilizing member rigidly supported on the rearward edge portion of the seat support structure and adapted to receive and retain the securing member when the seat-bed assembly is placed in the bed position thereby reinforcing the seat-bed assembly in the bed position.

3. The invention according to claim 2 and the stabilizing member comprising a hook-shaped member.

4. The invention according to claim 2 and the securing member including support means on the first edge portion of the inner back support stucture, and pin means being supported on the support means and being adapted to be engaged with and retained by the stabilizing member.

5. The invention according to claim 1 and a latch structure being movably supported on the structure for movement to and from a bed latching position and a seat latching position, the latch structure having first and second latching means thereon;

the inner back support structure having first catch means thereon;

the first latching means being adapted to latchingly retain the first catch means and the inner back support structure in the bed position when the latching structure is in the bed latching position; and the second latching means being adapted to retain the second catch means, the outer back swing arm means and the outer back support structure in the seat position when the latching structure is in the seat latching position, whereby the seat-bed unit is latched in the seat postion and the bed position.

6. The invention according to claim 5 and the latch structure comprising a V-shaped member pivotally supported on the base structure for rotational movement between the bed-latching position and the seat-latching position.

7. The invention according to claim 5 and the first latching means having a recess therein, the recess being adapted to receive, the first catch means therein for securing the seat-bed assembly in the bed position.

8. The invention according to claim 7 and spring means connecting the latch structure with the base structure whereby the first latching means is resiliently biased to move to the bed latching position and to latchingly entrap the first catch means in the recess.

9. The invention according to claim 5 and actuator arm means attached to the seat support structure, and an actuator member connecting the actuator arm means with the latch structure, the actuator member comprising a telescopic rod interconnecting the latch structure and the actuator arm means whereby initial movement of the seat support structure from the seat position to the bed position releases the first catch means from the first latch means.

10. The invention according to claim 9 and the telescopic rod including a cylinder member and a plunger member supported therein for sliding movement.

11. The invention according to claim 5 and the first catch means comprising pin means fixedly supported on the inner back support structure.

12. The invention according to claim 5 and the second latch means having a recess therein, the recess being adapted to receive and retain the second catch means against rearward movement, thereby securing the outer back support structure against rearward movement in the seat position.

13. The invention according to claim 5 and the linkage means including engagement means adapted to engage the latch structure when the linkage means is in the seat position for moving said latch structure into the seat latching position.

14. A convertible seat-bed assembly, comprising:

a base structure;

a seat support structure for supporting a seat cushion secured thereto and having a rearward edge portion;

an inner back support structure for supporting an inner back cushion secured thereto and having first and second edge portions;

an outer back support structure for supporting an outer back cushion secured thereto and having a forward edge portion;

connection means movably connecting the forward edge portion of the outer back support structure with the second edge portion of the inner back support structure;

linkage means for supporting the seat, inner back, and outer back support structures from the base structure for movement between a seat position and a bed position;

the seat support structure, the inner back support structure, and the outer back support structure being adapted to occupy generally the same horizontal plane in the bed position, the rearward edge portion of the seat support structure being adjacent the first edge portion of the inner back support structure and the second edge portion of the inner back support structure being adjacent the forward edge portion of the outer back support structure, the seat support structure extending rearwardly in the seat position, the first edge portion of the inner back support structure being spaced above and to the rear of the rearward edge portion of the seat support structure, the inner back support structure extending generally upward from the first edge portion, the forward edge portion of the outer back support structure being spaced rearwardly from the second edge portion of the inner back support structure, and the outer back support structure extending downwardly therefrom, and a securing member supported on the first edge portion of the inner back support structure, a stabilizing member rigidly supported on the rearward edge portion of the seat support structure and adapted to receive and retain the securing member when the seat-bed assembly is placed in the bed position thereby reinforcing the seat-bed assembly in the bed position, said stablilizing member having a recess therein, said securing member entering said recess when the seat bed assembly is moved into the bed position and withdrawing from said recess when the seat bed assembly is moved from the bed position to the seat position, said securing member being retained in said recess against movement rearwardly and downwardly with respect to the rearward edge portion of the seat support structure when the seat bed assembly is in the bed position for reinforcing said seat-bed assembly in said bed position.

15. The invention according to claim 14 and said securing member including pin means fixedly supported on the first edge portion of the inner back support structure;

said stabilizing member comprising a hook-shaped member entrapping the pin means when the seat-bed assembly is in the bed position.

16. A convertible seat-bed assembly, comprising:

a base structure;

a seat support structure for supporting a seat cushion secured thereto and having a rearward edge portion;

an inner back support structure for supporting an inner back cushion secured thereto and having a forward edge portion;

an outer back support structure for supporting an outer back cushion secured thereto and having a forward edge portion;

connection means movably connecting the forward edge portion of the outer back support structure with the second edge portion of the inner back support structure;

linkage means for supporting the seat, inner back, and outer back support structures from the base structure for movement between a seat position and a bed position, said linkage means including outer back linkage means connected with the outer back support structure for supporting said outer back support structure in the seat position and the bed position;

the seat support structure, the inner back support structure and the outer back support structure being adapted to occupy generally the same horizontal plane in the bed position, the rearward edge portion of the seat support structure being adjacent the first edge portion of the inner back support structure and the second edge portion of the inner back support structure being adjacent the forward edge portion of the outer back support structure;

the seat support structure extending rearwardly in the seat position, the first edge portion of the inner back support structure being spaced above and to the rear of the rearwafd edge portion of the seat support structure, the inner back support structure extending generally upward from the first edge portion, the forward edge portion of the outer back support structure being spaced rearwardly from the second edge portion of the inner back support structure, and the outer back support structure extending generally downwardly therefrom;

a latch structure being supported on the base structure having first and second latching means thereon;

the inner back support structure having first catch means thereon;

the outer back linkage means having second catch means thereon;

the first latching means retaining the first catch means and the inner back support structure in the bed position; and the second latching means retaining the second catch means to secure the outer back linkage means and the outer back support structure in the seat position, whereby the seat-bed assembly is secured by the latch structure in the seat position and the bed position.

17. The invention according to claim 16 and the latch structure being pivotally supported on the base structure for rotational movement between a bed-latching position and a seat-latching position.

18. The invention according to claim 16 and the first latching means having a recess therein, the recess being adapted to receive the first catch means therein for securing the seat-bed assembly in the bed position.

19. The invention according to claim 18 and spring means connecting the latch structure with the base structure and resiliently biasing the first latching means to latchingly entrap the first catch means in the recess.

20. The invention according to claim 19 and the latching structure having a camming portion thereon, and said first catch means engaging the camming portion to move the first latching means against the biasing of the spring means as the seat-bed assembly is moved into the bed position.

21. The invention according to claim 17 and actuator arm means attached to the seat support structure, and an actuator member connecting the actuator arm means with the latch structure, said actuator member transmitting initial movement of the seat support structure to the latching structure to release the first catch means from the first latch means as the seat support structure is moved out of the seat position.

22. The invention according to claim 21 and the actuator member comprising a telescopic rod interconnecting the latch structure and the actuator arm means.

23. The invention according to claim 17 and the latch structure including a V-shaped member having a pair of angled leg portions, the first and second latching means each supported on a respective leg portion.

24. The invention according to claim 1 and said base structure having a pair of spaced guide members thereon engageable with the inner back support structure to prevent lateral movement thereof with respect to the base structure when the seat-bed assembly is in the bed position.

* * * * *